United States Patent [19]

Maud et al.

[11] Patent Number: 4,931,804

[45] Date of Patent: Jun. 5, 1990

[54] AUTOMATIC TICKET DISPENSER

[75] Inventors: John R. Maud; Allan S. Cooper, both of Pietermaritzburg, South Africa

[73] Assignee: Latilla Holdings (Guernsey) Limited, Guernsey, Channel Islands

[21] Appl. No.: 236,644

[22] Filed: Aug. 25, 1988

[30] Foreign Application Priority Data

Aug. 27, 1987 [ZA] South Africa ........................ 87/6389

[51] Int. Cl.[5] ........................ G01D 15/20; G06K 15/00

[52] U.S. Cl. ........................................ 346/93; 235/378; 194/902; 364/467; 368/90

[58] Field of Search ........................ 346/78, 79, 80, 81, 346/89, 93; 340/51; 235/378; 368/90; 194/900, 902; 364/479, 467

[56] References Cited

U.S. PATENT DOCUMENTS

| | | | |
|---|---|---|---|
| 2,795,875 | 6/1957 | Nutter | 340/51 |
| 3,541,308 | 11/1970 | Ruby | 235/378 |
| 4,720,785 | 1/1988 | Shapiro | 235/378 |

*Primary Examiner*—Bruce A. Reynolds
*Assistant Examiner*—Scott A. Rogers
*Attorney, Agent, or Firm*—Darby & Darby

[57] ABSTRACT

An automatic ticket dispenser of the type which prints onto a ticket, as or before it is dispensed, information including that as to time and date is provided. The ticket dispenser employs an electronic time clock advantageously with a battery back-up power supply and an electronic print head such as a dot matrix print head in the path of movement of tickets being dispensed. The ticket dispenser is of a type which is particularly suitable for use at entrances to parking areas and the like.

9 Claims, 2 Drawing Sheets

AUTOMATIC TICKET DISPENSER

FIELD OF THE INVENTION

This invention relates to automatic ticket dispensers and, more particularly, to automatic ticket dispensers wherein a ticket being dispensed is required to have certain prevailing information, in particular the time and date, printed on the ticket at the time when it is dispensed.

Such ticket dispensers are widely used at entrances to parking garages or parking lots to automatically issue parking tickets to casual customers upon arrival. The ticket thus dispensed which carries information as to the time and date, is used, upon departure, for the automatic or manual calculation of a fee to be paid according to the time that has elapsed between when the ticket was dispensed and when payment is made. Such dispensers are usually used in combination with an automatic barrier which is opened once a ticket has been removed from the dispenser.

BACKGROUND OF THE INVENTION

As far as applicant is aware, automatic ticket dispensers employ electro-mechanical means for stamping the current date and time into a ticket at the time when it is dispensed. Such an arrangement generally consists of a one-revolution per-minute synchronous motor coupled to mechanically advanced numbered print wheels which are suitably cogged together to advance by one position every minute with the minute wheel advancing the tens of minutes wheel in known manner.

When a ticket is issued by such an apparatus a rubber stamp pad is raised beneath the ticket and clock mechanism and the raised numbers on the numbered wheels are imprinted on the ticket through an inked ribbon.

This arrangement has a number of disadvantages not the least of which is the fact that such a clock mechanism is susceptible to variations in the frequency of the mains supply and also must be reset each time after a power failure and at each month end. This ignores interim settings which may be necessary due to the inherently poor time keeping characteristics associated with such a clock.

In addition, and as a result of the complex mechanical nature of the clock mechanism, duct, dirt, and fluff from the tickets tends to accumulate and cause erratic operation necessitating frequent service calls and preventive maintenance. Also, after an extended period of operation, the cogs and ratchet mechanism of the clock are subject to wear and eventually begin to skip movements thereby resulting in incorrect time recordals on the tickets.

Furthermore, due to the complex electro-mechanical assembly of parts, serviving and repair is complicated tedious and accordingly costly.

It is the object of this invention to provide a ticket dispenser of the aforegoing general type but wherein the disadvantages outlined are, at least to some extent, alleviated.

SUMMARY OF THE INVENTION

In accordance with this invention there is provided an automatic ticket dispenser comprising ticket feed means, an electronic print head assembly in the path of movement of tickets dispensed by the dispenser, an electronic time clock and electronic control circuitry connected to the time clock and print head, the arrangement being such that the print head is operative to print required information concerning time as reflected by the time clock onto a ticket as it is dispensed in substantially continuous manner through the feed means.

Further features of the invention provide for the electronic print head to be a dot matrix print head; for the ticket feed means to include of a sprocket drum operated by a stepper motor through a worm gear drive; for the ticket dispenser to be adapted to dispense tickets stored in a substantially continuous form in which case the dispenser embodies a guillotine for separating individual tickets after printing and movement thereof to a dispensing position; for ticket movement to be controlled by optical sensors co-operating with prepunched notches or holes in the tickets; and for a ticket counter to be included for recording the number of tickets dispensed during any required time period.

It is also a feature of this invention that the individual units, such as the guillotine, print head, ribbon for a print head (if such be required), drive motor or the like be assembled on a substantially modular basis to enable quick and simple replacement of the modules to be achieved thereby enabling complex or high-tech repairs to be carried out at a central repair shop which can be fully equipped for such purposes. Such an arrangement minimises service call time for any one ticket dispenser. The same principle applies to the electronic control circuitry which is preferably arranged on series of plug-in type of circuit boards to render replacement extremely swift and simple.

In order that the invention may be more fully understood, one embodiment thereof will now be described with reference to the accompanying drawings.

DETAILED DESCRIPTION WITH REFERENCE TO THE DRAWINGS

Figure 1:
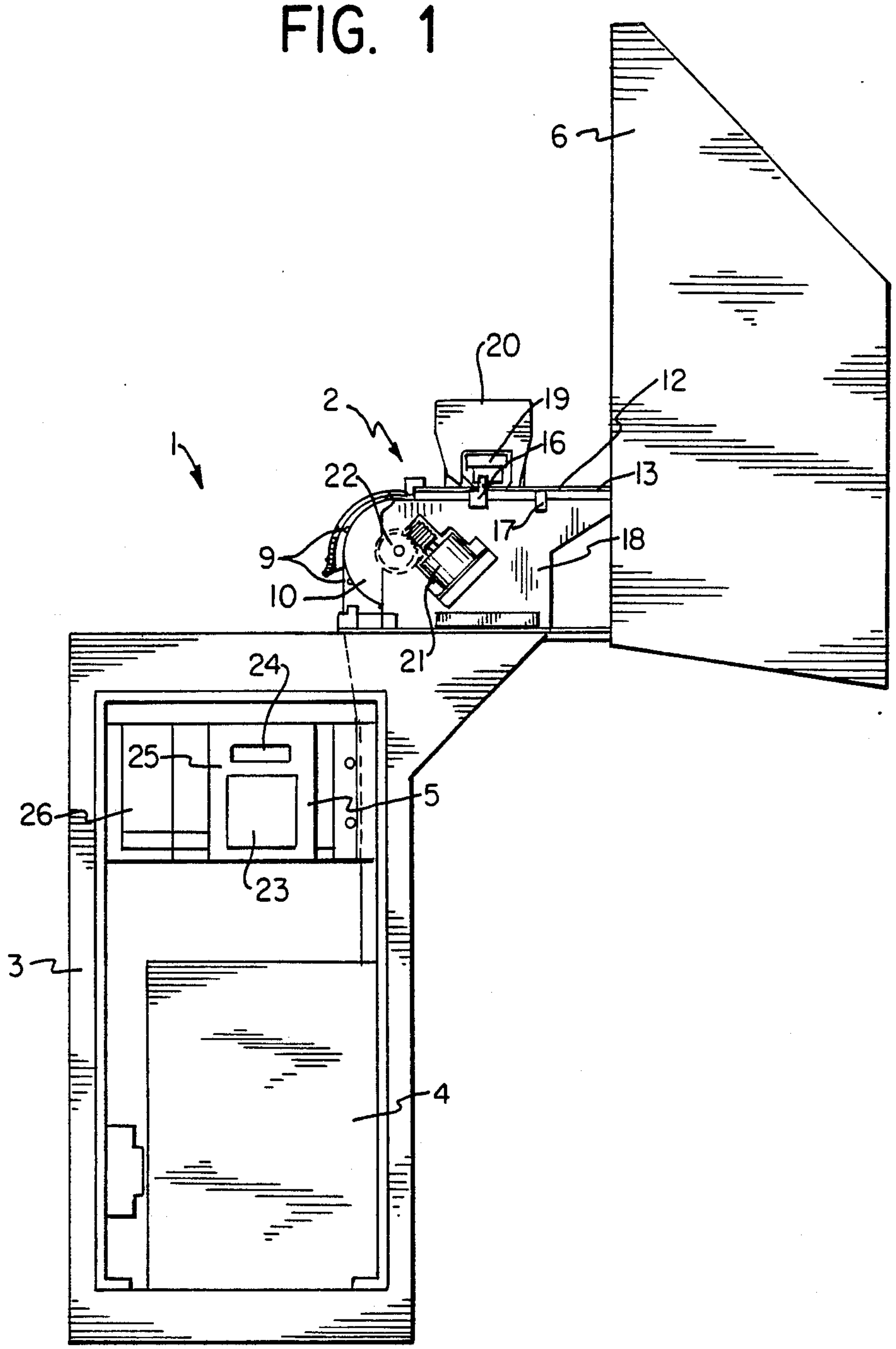
FIG. 1 is a schematic side elevation of a ticket dispenser according to the invention with the cover in the open position.
Figure 2:
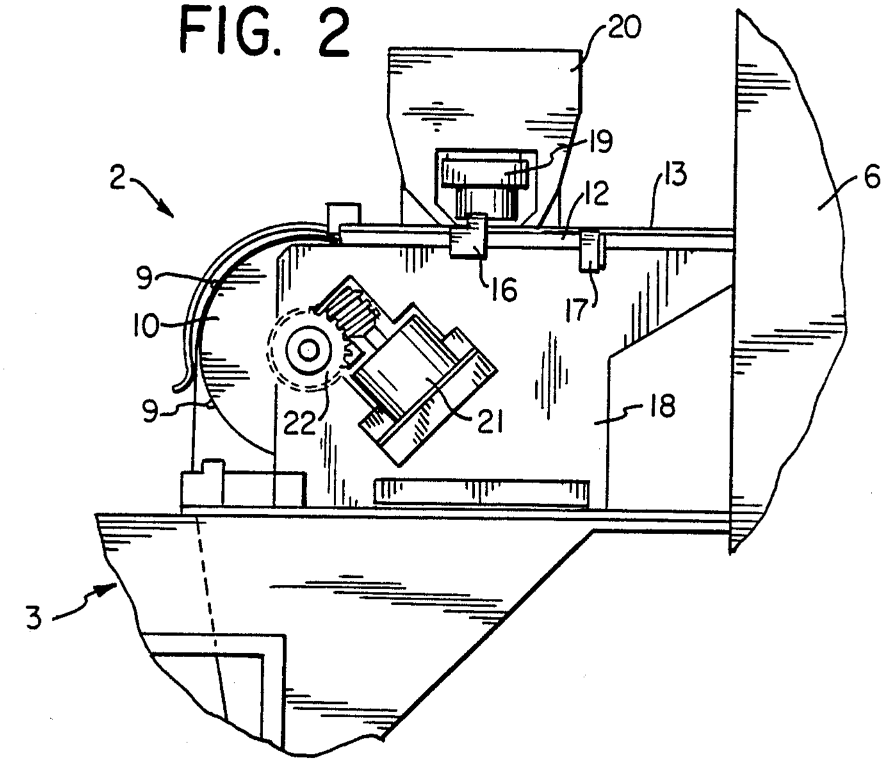
FIG. 2 is simply an enlargement of the ticket dispensing head of the dispenser.

In this embodiment of the invention an automatic ticket dispenser, generally indicated by numeral 1, has a ticket dispensing head 2 carried at the upper end of a pedestal base 3 which forms a housing for a ticket storage tray 4 and electronic control circuitry 5 for the ticket dispenser. The ticket dispenser head 2 has a cover 6 which can be tilted to an open position as illustrated or to a closed position in known manner.

The ticket dispenser is adapted to dispense tickets 7 stored in substantially continuous and folded form and which are prepunched with holes 8 co-operating with the sprockets 9 of a sprocket drum 10 forming part of the ticket feed of the dispenser head. The holes 8 cut in the prefabricated tickets are also employed, at least in this embodiment of the invention to co-operate with optical sensors for controlling the drive of the tickets.

Figure 3:
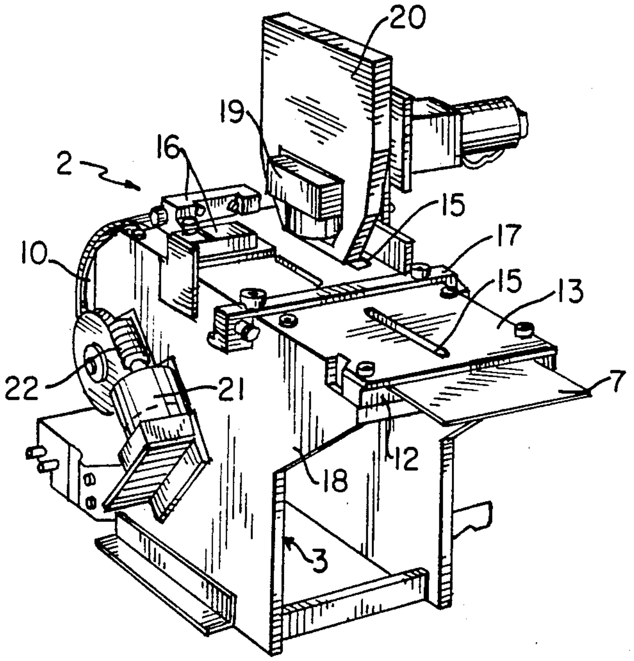
FIG. 3 is an isometric view of the dispensing head and, FIG. 4 is a view of a ticket dispensed by the ticket dispenser.
Figure 4:
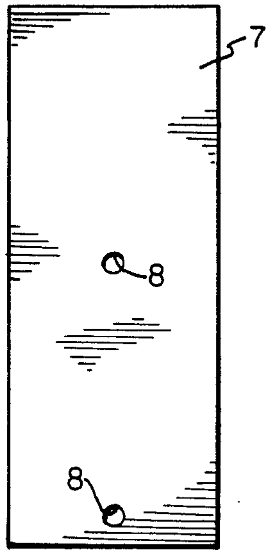

The sprocket drum 10 is adapted to push the tickets forwardly through feed path defined by a lower support plate 12 and upper guide plate 13 which are spaced to form a slot 14 (see FIG. 3) through which the ticket is fed. The plates have openings 15 wherever required for the location of optical sensors 16, for the access of the print head to the ticket surface and both plates are intercepted along their length by the presence of a guillotine 17. Both of the plates 12 and 13 and the guillotine 17 are carried by a chassis 18 secured to the upper end of the pedestal 3.

In compliance with the requirements of this invention a dot matrix type of electronic print head 19 is provided in the ticket dispense path and a co-operating cassette ribbon 20 is positioned suitably relative to the print head 19. This print head and cassette ribbon assembly is hingedly attached to the chassis so that it can be swung outwardly easily for the replacement of the cassette ribbon or, indeed, for replacement of the print head if required.

Forward movement of the sprocket drum 10 is achieved through a stepper motor 21 which drives the drum through a worm gear drive 22. The stepper motor and dot matrix print head as well as the guillotine are all controlled through the electronic control circuitry 5 which embodies a micro processor and an electronic real time clock which offers full calendar and leap year calculation functions. Such electronic clocks offer totally satisfactory accuracies of the order of one minute per month. Also, the clock has a battery back up power supply to ensure that proper time is kept during power failures and the like and that the clock does not have to be reset after the power has been off.

Preferably there is provided an input keyboard 23 and an electronic time display 24 in the housing 25 for the electronic control circuitry, the input keyboard enabling both the time and date of the time clock to be set, as and when required, and also to enable additional identification information to be installed in the circuitry so that such additional information is printed onto a ticket as it is moved past the print head.

The latter information may be stored in an electrically erasible programmeable read only memory unit so as to be retained regardless of the state of the incoming supply voltage.

The ticket dispenser can be achieved either by push button or automatically by a detector 26 connected to a road loop or the like.

It will be understood that, in use, the time need be set on the time clock only very occasionally and any required additional information input through the keyboard 23.

When activated the stepper motor will drive the continuous ticket arrangement through the feed path and the dot matrix printer will simultaneously print the time, date and additional information onto the ticket as it moves past the print head. As the end of the movement of one ticket, which is detected by the optical sensors, the guillotine is activated and the ticket may be withdrawn by the person in the usual way.

Preferably the dispenser is also provided with a counter to count the total number of tickets issued.

It will be understood that, as indicated above, the circuitry is all included on individual plug-in type of circuit boards, and the individual units such as the guillotine, stepper motor, print head and the like are all made to be easily replaced to thereby minimise the frequency and duration of service calls.

Many variations may be made to the above described embodiment of the invention without departing from the scope hereof. In particular different types of electronic print heads could be employed and the means of driving a sprocket drum or the equivalent thereof could be varied accordingly. Also, such a ticket dispenser could include means for additionally recording the information on a magnetic stripe applied to the tickets to enable the tickets to be employed for automatically activating a reader in an automatic pay booth or, indeed, the dot matrix characters could be made to be of a readable format themselves.

The invention therefore provides a more reliable and more easily maintained automatic ticket dispenser than prior art similar dispensers.

What we claim as new and desire to secure by Letters Patent is:

1. An automatic ticket dispenser comprising:

ticket feed means for dispensing tickets in a path, an electronic time clock for clocking time, an electronic print head assembly in the path for printing required information concerning time as reflected by the time clock onto the tickets as the tickets are dispensed in a substantially continuous manner through the feed means; and a lower support plate and an upper guide plate between which passes the path, said plates having apertures therethrough for the print head to access the tickets to be printed one at a time and having apertures therethrough for optical sensors to access a ticket's surface.

2. An automatic ticket dispenser as claimed in claim 1 wherein the electronic print head is a dot matrix print head.

3. An automatic ticket dispenser as claimed in claim 1 wherein the ticket feed means includes a sprocket drum operated by a stepper motor through a worm gear drive.

4. An automatic ticket dispenser as claimed in claim 3 wherein the sprocket drum is located behind the print head in the path.

5. An automatic ticket dispenser as claimed in claim 1 further comprising included a guillotine for separating individual tickets from a substantially continuous store thereof.

6. An automatic ticket dispenser as claimed in claim 1 wherein the electronic time clock has a battery back-up power supply.

7. An automatic ticket dispenser as claimed in claim 1 further comprising electronic control circuitry connected to the time clock and print head, said electronic control circuitry including input means for varying information other than time and date to be printed on the tickets.

8. An automatic ticket dispenser as claimed in claim 1, wherein each of said ticket feed means, said electronic print head assembly and said electronic time clock are individual modular units.

9. An automatic ticket dispenser comprising:

ticket feed means for dispensing tickets in a path, an electronic time clock for clocking time, an electronic print head assembly in the path for printing required information concerning time as reflected by the time clock onto the tickets as the tickets are dispensed in a substantially continuous manner through the feed means;

optical sensors for sensing pre-punched holes or notches in the tickes to be dispensed; and a lower support plate and an upper guide plate between which passes the path, said plates having apertures therethrough for the optical sensors to access a ticket's surface.

* * * * *